United States Patent [19]

Bender

[11] Patent Number: 4,486,517
[45] Date of Patent: Dec. 4, 1984

[54] WET-CELL STORAGE BATTERY
[75] Inventor: Ulrich Bender, Siegen, Fed. Rep. of Germany
[73] Assignee: Firma Emil Bender, Siegen, Fed. Rep. of Germany
[21] Appl. No.: 543,124
[22] Filed: Oct. 18, 1983
[30] Foreign Application Priority Data Oct. 18, 1982 [DE] Fed. Rep. of Germany ....... 3238485

[51] Int. Cl.³ .............................................. H01M 6/10
[52] U.S. Cl. .................................... 429/149; 429/161; 429/209; 429/233; 429/242
[58] Field of Search ........ 429/149, 161, 233, 241–244, 429/209, 94

[56] References Cited

U.S. PATENT DOCUMENTS

| | | | |
|---|---|---|---|
| 509,270 | 11/1893 | Usher | 429/241 X |
| 713,186 | 11/1902 | Welford | 429/241 |
| 800,128 | 9/1905 | Gardiner | 429/241 X |
| 860,291 | 7/1907 | Gardiner | 429/241 |
| 1,032,158 | 7/1912 | Porscke et al. | 429/243 |
| 2,906,802 | 9/1959 | Andre | 429/149 |
| 3,239,380 | 3/1966 | Berchielli | 429/149 X |

Primary Examiner—Anthony Skapars
Attorney, Agent, or Firm—Karl F. Ross; Herbert Dubno

[57] ABSTRACT

A storage battery of the type used in an automotive vehicle has a housing forming a plurality of transversely elongated and upright cells and respective plus sets and minus sets of U-section electrode elements interleaved with each other in each cell. Each such element is unitarily formed with an imperforate sheet-metal back having a pair of opposite edges, respective expanded sheet-metal arms extending from the edges generally perpendicular to the back, and an imperforate connection tab projecting upward from the back. Each back has a horizontal width that is a fraction of the horizontal width of the respective arms. Respective plus and minus bus bars in each of the compartments are connected to the tabs of the respective electrode sets. The arms are multiply expanded, that is each one has a width that is a multiple of its width before it was slitted and expanded. The arm width is equal to at least four times the back width, normally about five times the back width. Typically the back width is between 3 mm and 10 mm and the back has a thickness of between 0.4 mm and 2.0 mm.

11 Claims, 5 Drawing Figures

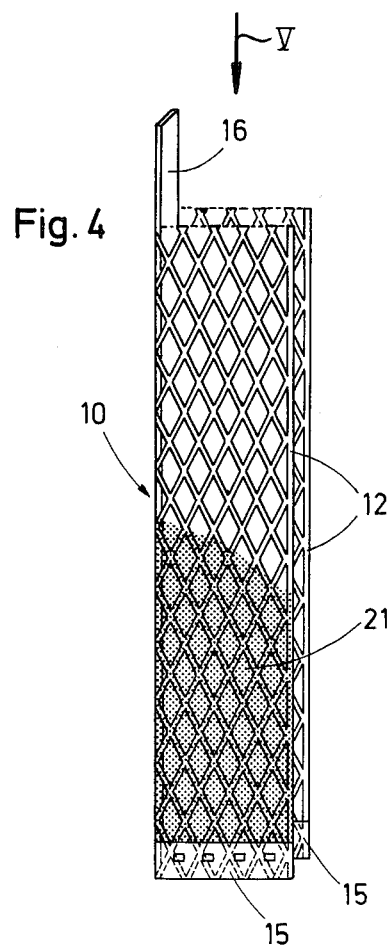
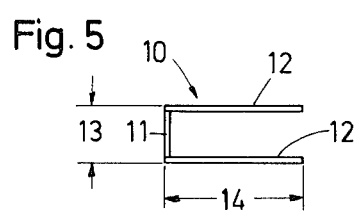

WET-CELL STORAGE BATTERY

FIELD OF THE INVENTION

The present invention relates to a wet-cell storage battery. More particularly this invention concerns such a battery that is used in an automotive vehicle as a starter or used as a power battery.

BACKGROUND OF THE INVENTION

A standard wet-cell battery of the type used to start an internal-combustion engine of an automotive vehicle or used to power an electric lift truck or the like has a housing or casing subdivided by partitions into a plurality of individual compartments or cells each filled with a respective bath of an electrolyte, normally a liquid acid. Each cell further contains a plurality of positive electrode elements and a plurality of negative electrode elements interleaved therewith. All the positive elements of each cell are connected together by a positive bus bar and all the negative elements by a negative bus bar. The negative bar of the cell at one end of the battery is connected to a negative terminal on the battery top, and the positive bar of the cell at the opposite battery end is connected to a positive terminal at the opposite end of the battery top. The intervening positive and negative buses are connected together plus-to-minus with the cells in series, thereby increasing output voltage. These elements are of lead, nickel, or cadmium and react with the electrolyte and each other to produce electricity.

As described in U.S. Pat. No. 3,853,626 and in German patent document No. 3,011,836, it is possible to use expanded metal to make the electrode elements instead of the cast construction once employed. Expanded metal, which is made by forming a plurality of rows of evenly spaced slits with the slits staggered from row to row, and then pulling the metal perpendicular to the slits to open them up into holes, can be made extremely cheaply from low-cost rolled sheet metal.

In this type of wet-cell battery individual rectangles of the expanded metal are aligned with the cells. These cells are elongated transversely of the battery, so all the electrode plates therefore are parallel to one another and perpendicular to the battery. Typically there are between eight and fourteen such expanded-metal plates in each cell, so that a six-cell battery has between 48 and 84 plates overall.

It is further known to arrange the electrode plates parallel to the battery, that is transversely of the respective cells. Each cell can hold up to 66 individual small such plates, so that a six-cell battery will have 396 expanded-metal electrode plates overall. Such construction substantially reduces the internal resistance of the plates, since the path from the furthest point on each small plate to the respective bus is inherently short. As a result the high-current output of such a battery is considerable. In such arrangements, however, the plates, bus bars, and terminals are all cast. This allows all of the parts to be positioned accurately and eliminates complicated fabrication procedures, but is a costly style of manufacture and uses a substantial mass of valuable metal. In fact the increased cost of the cast metal more than outweighs the increases in efficiency.

OBJECTS OF THE INVENTION

It is therefore an object of the present invention to provide an improved wet-cell battery.

Another object is the provision of such a wet-cell battery which overcomes the above-given disadvantages, that is which is highly efficient and that can be produced at low cost.

A further object is the provision of an improved such battery particularly adapted for use as the starting battery of the engine of an automotive vehicle or as the power battery for a lift-truck or the like.

SUMMARY OF THE INVENTION

A storage battery of the type used in an automotive vehicle according to the invention has a housing forming a plurality of transversely elongated and upright cells and respective plus sets and minus sets of U-section electrode elements interleaved with each other in each cell. Each such element is unitarily formed with an imperforate sheet-metal back having a pair of opposite edges, respective expanded sheet-metal arms extending from the edges generally perpendicular to the back, and an imperforate connection tab projecting upward from the back. Each back has a horizontal width that is a fraction of the horizontal width of the respective arms. Respective plus and minus bus bars in each of the compartments are connected to the tabs of the respective electrode sets.

According to this invention the arms are multiply expanded, that is each one has a width that is a multiple of its width before it was slitted and expanded. The arm width according to this invention is equal to at least four times the back width, normally about five times the back width. Typically the back width is between 3 mm and 10 mm and the back has a thickness measured horizontally and transverse to its width of between 0.4 mm and 2.0 mm. In this arrangement the arms have a width of between 16 mm and 50 mm.

According to another feature of this invention in each cell the backs and tabs of the elements of the positive set are coplanar and the backs and tabs of the elements of the negative set lie in a common plane parallel to the plane of the respective positive set. The arms of the positive set in each cell are interleaved with and lie between the arms of the respective negative set. Such an arrangement can be provided with respective meandering insulating strips extending in the cells between the respective sets of plates. In addition the cells have generally parallel and confronting inner wall faces to which the respective backs are bonded.

In accordance with another feature of this invention the elements and bars are of rolled sheet metal and the battery has cast terminals connected to the bus bars. In this manner material costs are minimized, especially when, according to this invention, the elements and bars are made of an alloy of lead, nickel, aluminum, copper, or the like.

The instant invention is not only applicable to secondary batteries, but also to primary batteries and even to dry-cell batteries.

The battery according to this invention can have about 40% less internal resistance than prior-art batteries with the same mass of electrode metal. Thus a battery of given weight can be more powerful, or the same power can be obtained from a smaller battery. The individual electrode elements can be made very easily from rolled strip stock 16 mm to 20 mm wide, and waste will be reduced by about 80% as opposed to the prior-art electrode fabrication processes.

DESCRIPTION OF THE DRAWING

The above and other features and advantages will become more readily apparent from the following, reference being made to the accompanying drawing in which:

FIG. 4 is a large-scale perspective view of a detail of the battery of this invention; and FIG. 5 is a top view taken in the direction of arrow V of FIG. 4.

SPECIFIC DESCRIPTION

Figure 1:
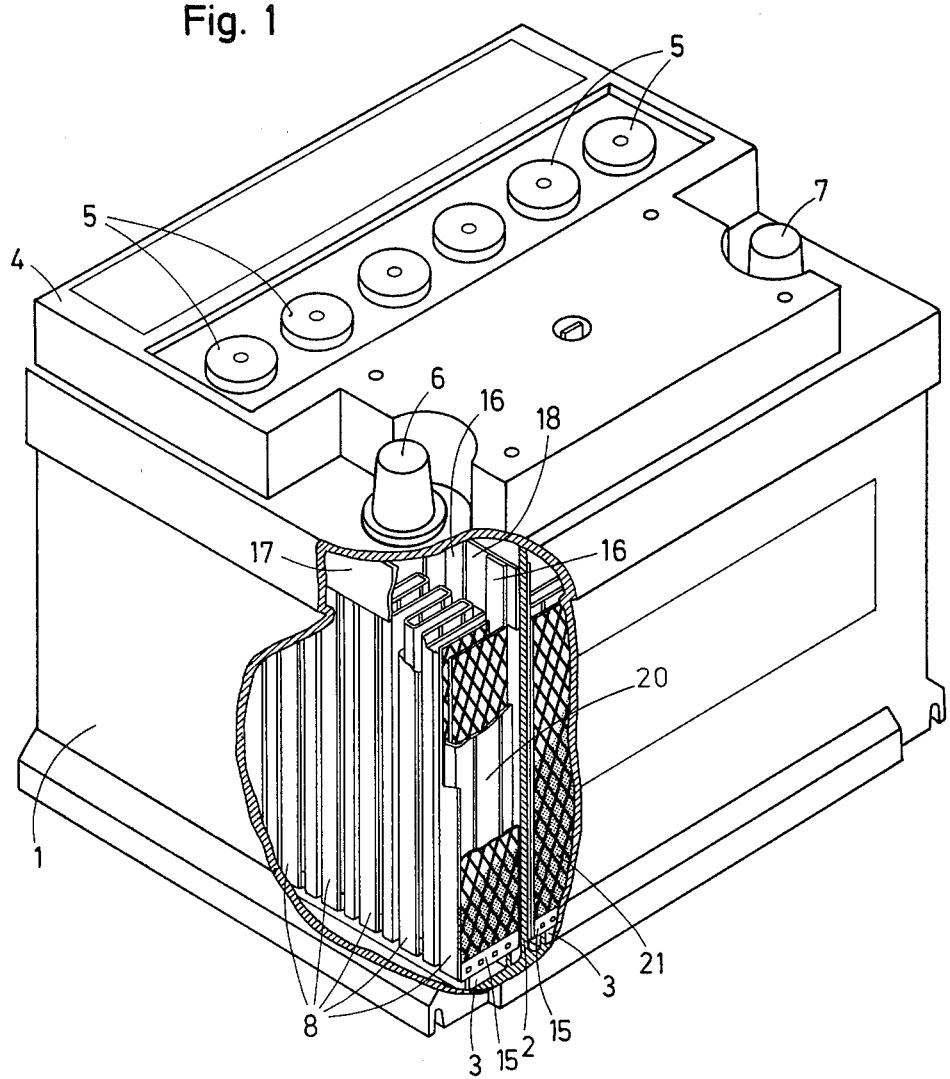
FIG. 1 is a partly broken-away perspective view of the battery according to this invention.
Figure 2:
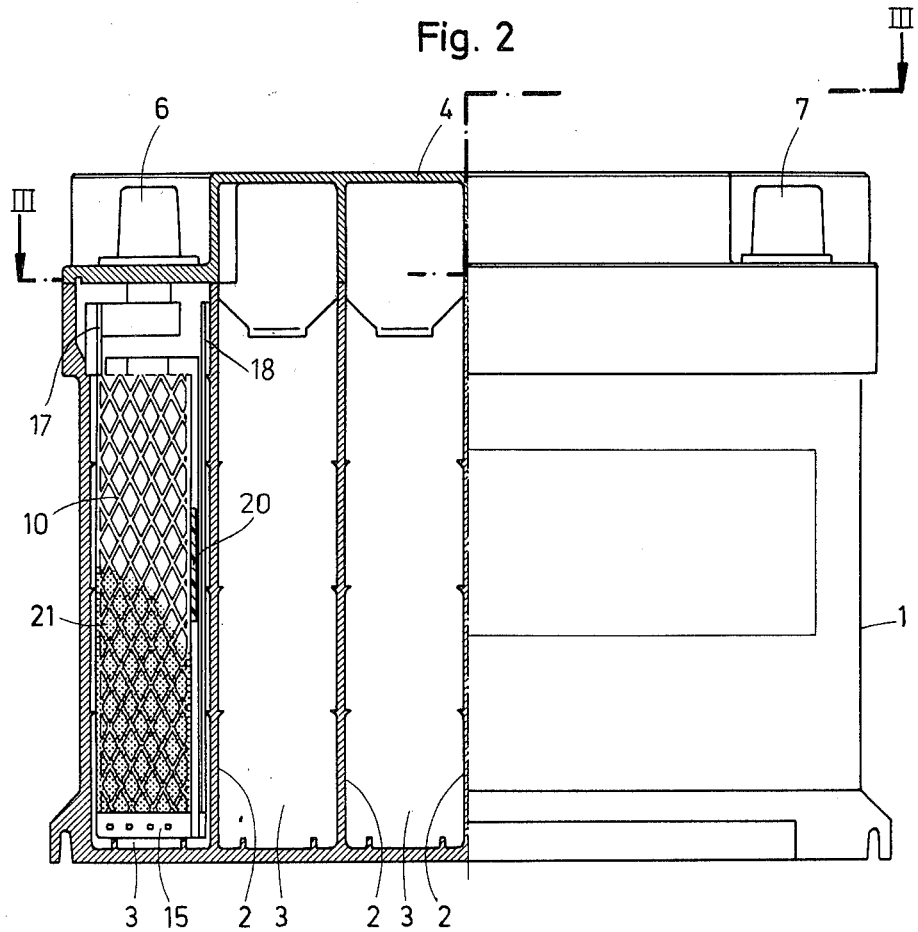
FIG. 2 is a partly vertical sectional and partly side view of the battery of FIG. 1.
Figure 3:
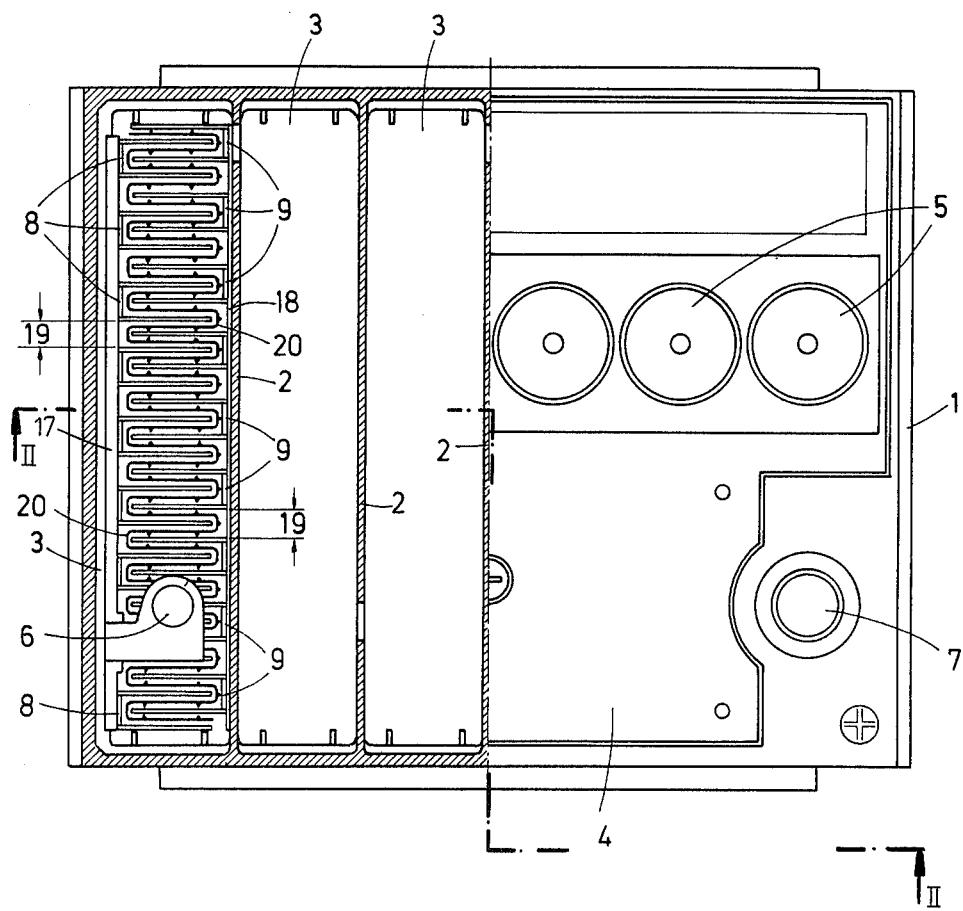
FIG. 3 is a partly sectional view taken along line III—III of FIG. 2, line II—II of FIG. 3 indicating the plane of the view of FIG. 2.

As seen in FIGS. 1 through 3, the battery of this invention has a hard-rubber or synthetic-resin housing or casing 1 formed as the standard parallepipedal box and subdivided longitudinally by five transverse and upright partitions 2 into six individual compartments or cells 3. The cells 3 are all closed by a top wall 4 provided at each cell 3 with a fill cap 5 that can be removed so the cells 3 can be filled with liquid electrolyte. At one end cell 3 on the top wall 4 there is the standard cast metal negative terminal 6 and at the opposite end cell 3 is the identical positive terminal 7. Internally each of the cells is provided with a cathodic or negative plate set 8 and an anodic or positive plate set 9 interleaved therewith. The plate sets 8 and/or 9 are formed of individual U-section electrode elements 10 shown in better detail in FIGS. 4 and 5.

Each such element 10 has an upright back or bight portion 11 that is of continuous and imperforate and that normally extends transversely of the battery, in line with the respective cell 3. Two openwork arms 12, here formed unitarily with the back 11 of expanded sheet metal, extend perpendicular to the back 11 in the same direction longitudinally of the battery casing 1 and perpendicular to the respective transversely extending cell.

The back 11 has a transverse width 13, measured horizontally and transversely of the casing 1, that is equal to a fraction of the longitudinal width 14, measured horizontally and longitudinally of the casing 1, of the arms 12. In fact a back width 13 of 5 mm can easily be used with an arm width 14 of 24 mm, a ratio of almost 5:1.

Typically the sheet metal blank that forms the back 11 and from which the arms 12 are formed has a thickness of between 0.6 mm and 0.7 mm and a starting width of 16 mm to 17 mm. Thus the metal of each arm 12 has been expanded from about 5 mm to 24 mm, a factor of about five. First it is appropriately slit, then expanded in its own plane, and then the two arms 12 are bent at a right angle to the imperforate bight or back 11.

Each of the elements 10 is provided along its lower region with a U-section cover sheet 15 of a synthetic resin that is formed with bumps so it can be slipped over and will hold on the element 10. This sheet 15 serves to hold the active paste 21 in place in the lower region of the electrode element 10. Furthermore each element 10 has a tab 16 forming an upward extension of its back 11 and in fact formed unitarily of rolled lead sheet therewith.

In the casing 1 the tabs 16 of the respective plate sets 8 and 9 are secured to respective collector or bus strips or bars 17 and 18. The bar 17 of the cell at the minus terminal 6 is connected thereto and the bar 18 of the opposite end compartment is connected to the positive terminal 7, whereas each other plate 17 is connected to the immediately adjacent plate 18 for series connection of the cells 3 as is well known.

Inside the cells 3 the backs 11 are bonded by an appropriate adhesive to the respective walls of the casing 1 and at a spacing 19. The plates elements 10 of the one set 8 are staggered and interleaved with the plates 10 of the other set 9. A dielectric spacing strip 20 meanders between the two interleaved sets 8 and 9 to hold them mechanically apart, preventing short circuits from occuring even if the battery is subjected to substantial jarring.

Except for the cast terminals 6 and 7, all the lead in the battery of this invention can be of the rolled variety. This substantially reduces costs. In addition the unitary elements 10 can be made very inexpensively, and can use a relatively small mass of metal while still obtaining a very high surface area, so the surface density, that is the ratio of surface area to mass, is relatively high. The unitary construction allows the internal battery resistance to be reduced by some 40%, and the openwork construction insures excellent circulation of the electrolyte within the cells 3. Furthermore this construction increases short-circuit capacity over batteries of identical lead mass, and greatly increases the high-current capacity.

I claim:

1. A storage battery of the type used in an automotive vehicle, the battery comprising:
   a housing forming a plurality of transversely elongated and upright cells;
   respective plus sets and minus sets of U-section electrode elements interleaved with each other in each cell, each element being unitarily formed with
      an imperforate sheet-metal back having a pair of opposite edges,
      respective expanded sheet-metal arms extending from the edges generally perpendicular to the back, the back having a horizontal width that is a fraction of the horizontal width of the arms, and
      an imperforate connection tab projecting upward from the back; and
   respective plus and minus bus bars in each of the compartments connected to the tabs of the respective electrode sets.

2. The storage battery defined in claim 1 wherein the arms are multiply expanded.

3. The storage battery defined in claim 1 wherein the arm width is equal to at least four times the back width.

4. The storage battery defined in claim 3 wherien the arm width is generally five times the back width.

5. The storage battery defined in claim 1 wherein the back width is between 3 mm and 10 mm.

6. The storage battery defined in claim 1 wherein the back has a thickness of between 0.4 mm and 2.0 mm.

7. The storage battery defined in claim 1 wherein in each cell the backs and tabs of the elements of the positive set are coplanar and the backs and tabs of the elements of the negative set lie in a common plane parallel to the plane of the respective positive set, the arms of the positive set in each cell being interleaved with and lying between the arms of the respective negative set.

8. The storage battery defined in claim 7, further comprising respective meandering insulating strips extending in the cells between the respective sets of plates.

9. The storage battery defined in claim 7 wherein the cells have generally parallel and confronting inner wall faces to which the respective backs are bonded.

10. The storage battery defined in claim 1 wherein the elements and bars are of rolled sheet metal, the battery further comprising:

cast terminals connected to the plate sets.

11. The storage battery defined in claim 1 wherein the elements and bars are made of an alloy of lead, nickel, aluminum, or copper.

* * * * *